R. W. Gardner,
Governor.
No. 2,064. Reissued Sep. 5, 1865.
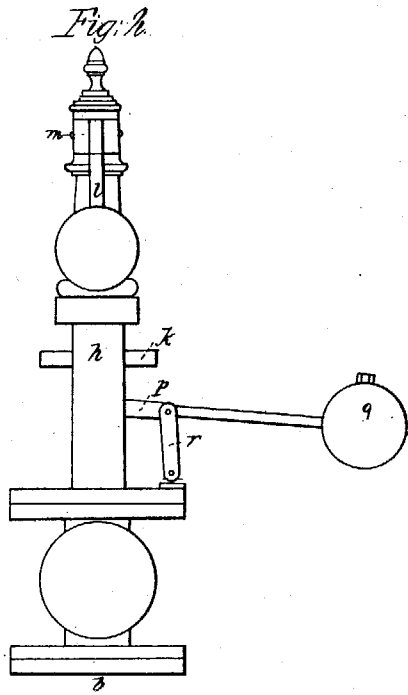
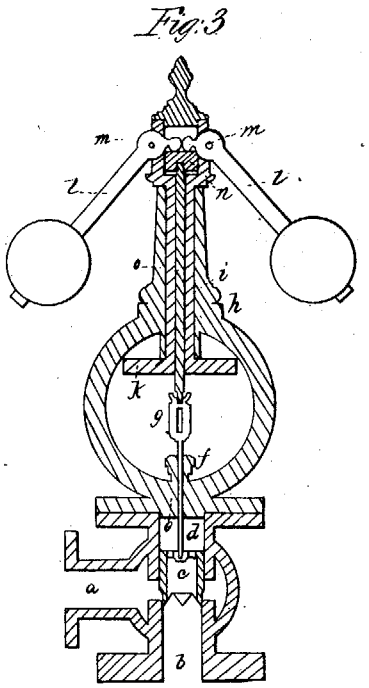
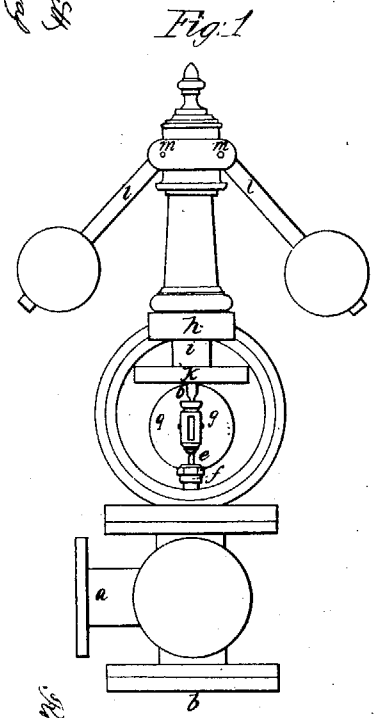
Witnesses:
Edward Everett
Samuel Jones
Inventor
Robert W. Gardner

UNITED STATES PATENT OFFICE.

ROBERT W. GARDNER, OF QUINCY, ILLINOIS.

IMPROVEMENT IN STEAM-ENGINE GOVERNORS.

Specification forming part of Letters Patent No. 29,579, dated August 14, 1860; Reissue No. 2,064, dated September 5, 1865.

*To all whom it may concern:*

Be it known that I, ROBERT W. GARDNER, of Quincy, in the county of Adams and State of Illinois, have invented a new and useful Improvement in Governors; and I do hereby declare that the following is a full, clear, and exact description thereof, which will enable others skilled in the art to make and use the same, reference being had to the accompanying drawings, forming part of this specification, in which—

Figure 1 represents a front elevation of my invention. Fig. 2 is a side elevation of the same. Fig. 3 is a vertical central section of the same.

Similar letters of reference indicate like parts.

In all governors for steam-engines and other machines as now constructed there are necessarily a number of separate parts acting on each other by means of numerous joints, sliding and bearing surfaces, all of which, in order that the governor may not be impeded in its action and not have its sensitiveness impaired by undue friction, must have a certain degree of play or looseness, the amount of which combined makes up a considerable quantity of "lost motion" before a change of motion in the governor can act on the valve, so that a very considerable change of velocity of the engine is permitted while the governor is taking up the lost motion and before it is brought to bear on the valve.

The object of this invention is to obviate these defects, thereby rendering the governor extremely sensitive to the slightest variations in the speed of the engine and transferring its motion without loss to the valve.

The chamber *d*, which contains the cylindrical balance-valve *c*, connects by a suitable pipe, *a*, with the steam-boiler and by a passage, *b*, with the steam-chest. The valve *c* is fitted near its lower edge on a conical seat in the steam-passage, which is thereby closed when the valve is down, and when said valve is raised the steam passes by the annular opening above the valve-seat and between the serrated teeth in the lower edge of the valve. It (the valve) is provided with apertures in its top, which serve to equalize the pressure above and below. The valve-rod *e* passes up through a stuffing-box, *f*, to the head *g*, and the several parts of the governor work within the standard or frame *h*.

The hollow shaft *i* revolves in the pillar of the standard *h*, having its driving-pulley or gear-wheel *k* at its lower extremity and the cap at its upper end, which supports the two arms or levers *l*, from the outer extremities of which the balls are suspended and which work on the pivots *m* as fulcra. The cap of the hollow shaft *i* is bored smooth, and the block *n*, affixed as a head on the spindle *o*, plays up and down within it, bearing against the short ends or toes *l'* of the pendulum-arms *l*.

The head *g* of the valve-rod has a slot in which the lever *p* is inserted, constantly pressing it upward by the action of the adjustable weight *q* on the opposite side of the link-fulcrum *r*. The end of the spindle *o* is not connected with the head of the valve-rod *g*, but merely rests and revolves on it, a cavity being formed round it to retain the oil.

The sliding weight *q* is adjusted in such a position on the lever *p* as nearly to balance the weight of the valve-rod and the moving parts of the governor, and, the principal part of the weight being thus sustained by a single point, the broader bearing-surfaces are relieved and thereby an important saving in friction is effected; but the main object of this arrangement is the entire obviation of the lost motion, which is attained by the several joints and bearing-surfaces being constantly pressed against each other in the same direction by the action of the weight *q*, so that whether the balls are ascending or descending by the varying velocity of the engine the joints or fittings, however loose they may have been made or may have become by wear, are never relaxed so as to allow of the slightest play or lost motion.

The balls cause the valve to move in one and the weight in the opposite direction, and by this combination I am enabled to use a valve with a very small range of motion, like the one shown in the drawings, though my governor is applicable to valves of any other description. Furthermore, by this arrangement the steam can be shut off and the engine stopped with great facility, independently of the action of the governor, in case of a sudden emergency, by means of the lever *p*, which, with the addition of a cord or other contrivance, can be made available in any part of the building and the power of stopping the engine at any moment be at hand without the delay of calling on the engineer. The speed of the engine may also be regulated by adjusting the position of the weight *q* so as to balance more or less of the weight of the governor, thereby giving a different opening of the valve to the same elevation of the balls.

I claim as new and desire to secure by Letters Patent—

1. The governor, operated as described—namely, by using the centrifugal force of the pendulum-balls to close the valve and the gravitation of the adjustable weight on the lever to open said valve, the two forces working against and independent of each other, substantially as herein specified.

2. The spindle *o* of the governor, supported on the head of the valve-stem but unconnected therewith, in combination with a weighted lever tending to keep the several parts in close contact and partly balancing the weight of the moving parts of the governor, substantially as and for the purpose described.

3. The toes *l'* on the upper end of the pendulous arms *l* in their arrangement with the sliding block or cap *n* and vertical valve-rod *o*, constructed and operated substantially as described, whereby the upward vibration of the governor-arm is caused to act immediately and independently to close the valve in opposition to the influence of the weighted lever.

4. The combination of the lever *p*, adjustable weight *q*, link *r*, step *g*, valve-rod *e*, spindle *o*, and pendulum-arms *l*, all constructed and operating substantially as and for the purpose herein specified.

ROBT. W. GARDNER.

Witnesses:

JOHN ROBERTSON,
SAM. STEVENSON.